(12) United States Patent
Tarnowski

(10) Patent No.: US 8,946,916 B2
(45) Date of Patent: Feb. 3, 2015

(54) CONTROLLING A WIND TURBINE TO STABILIZE AN ELECTRIC GRID

(75) Inventor: Germán Claudio Tarnowski, Hellerup (DK)

(73) Assignee: Vestas Wind Systems A/S, Aarhus N (DK)

(*) Notice: Subject to any disclaimer, the term of this patent is extended or adjusted under 35 U.S.C. 154(b) by 506 days.

(21) Appl. No.: 13/381,630

(22) PCT Filed: Jun. 25, 2010

(86) PCT No.: PCT/EP2010/003903
§ 371 (c)(1),
(2), (4) Date: Mar. 13, 2012

(87) PCT Pub. No.: WO2011/000531
PCT Pub. Date: Jan. 6, 2011

(65) Prior Publication Data
US 2012/0161444 A1    Jun. 28, 2012

Related U.S. Application Data

(60) Provisional application No. 61/221,134, filed on Jun. 29, 2009.

(30) Foreign Application Priority Data

Jun. 29, 2009    (EP) ...................................... 09163969

(51) Int. Cl.
*F03D 9/00*    (2006.01)
(52) U.S. Cl.
USPC .................................. 290/44; 290/55; 416/41
(58) Field of Classification Search
USPC .............................. 290/43, 44, 55; 416/41, 36
See application file for complete search history.

(56) References Cited

U.S. PATENT DOCUMENTS 7,528,496 B2 * 5/2009 Fortmann ......................... 290/44
8,046,109 B2 * 10/2011 Larsen et al. .................. 700/293
(Continued)

FOREIGN PATENT DOCUMENTS

| DE | 10022974 A1 | 5/2000 |
| EP | 1467463 A | 10/2004 |
| WO | 2005025026 A | 3/2005 |

OTHER PUBLICATIONS

International Search Report for International Application No. PCT/EP2010/003903 dated Mar. 29, 2011.
(Continued)

*Primary Examiner* — Nicholas Ponomarenko
(74) *Attorney, Agent, or Firm* — Patterson & Sheridan, LLP

(57) ABSTRACT

A variable speed wind turbine is configured to provide additional electrical power to counteract non-periodic disturbances in an electrical grid. A controller monitors events indicating a need to increase the electrical output power from the wind turbine to the electrical grid. The controller is configured to control the wind turbine as follows: after an indicating event has been detected, the wind turbine enters an overproduction period in which the electrical output power is increased, wherein the additional electrical output power is taken from kinetic energy stored in the rotor and without changing the operation of the wind turbine to a more efficient working point. When the rotational speed of the rotor reaches a minimum value, the wind turbine enters a recovery period to re-accelerate the rotor to the nominal rotational speed while further contributing to the stability of the electrical grid by outputting at least a predetermined minimum electrical power.

16 Claims, 13 Drawing Sheets

(56) References Cited

U.S. PATENT DOCUMENTS

| | | | |
|---|---|---|---|
| 8,249,852 B2* | 8/2012 | Thulke | 703/18 |
| 8,258,643 B2* | 9/2012 | Bonnet | 290/44 |
| 8,317,471 B2* | 11/2012 | Axelsson et al. | 416/41 |
| 2003/0155773 A1 | 8/2003 | Wobben | |
| 2012/0161444 A1* | 6/2012 | Tarnowski | 290/44 |

OTHER PUBLICATIONS

European Search Report for International Application No. 09163969 dated Feb. 9, 2010.

Prillwitz, Holst and Weber: ""Primarregelung mit Windkraftanlagen"", ETG-Workshop Neue Dezentraleversorgungsstrukturen, Feb. 19-20, 2003,Fran KFU RT/M, , [Online] Feb. 19, 2003, pp. 1-6.

Holst, Prillwitz, Weber, and Schmidt: ""Netzregelverhalten von Windkraftanlagen"",Sichere Und Zuverlassige Systemfuhrung Vonkraftwerk und Netz 1M Zeichen Derderegulierung Tagung; Munchen, 21. und 22.Mai 2003—VDI/VDE-Gesellschaft Mess-Undautomatisierungstechnik, VDI-Verlag,Dusseldorf, DE, [Online]May 21, 2003, pp. 1-15.

Ullah N. R et al: ""Temporary Primary Frequency Control Support by Variable Speed Wind Turbinesa Potential and Applications"",IEEE Transactions on Power Systems, IEEEService Center, Piscataway, NJ, US,vol. 23, No. 2, May 1, 2008,pp. 601-612.

E.On Netz GmbH: The Grid Code 2006.: Apr. 2006.

* cited by examiner

*Fig. 5*
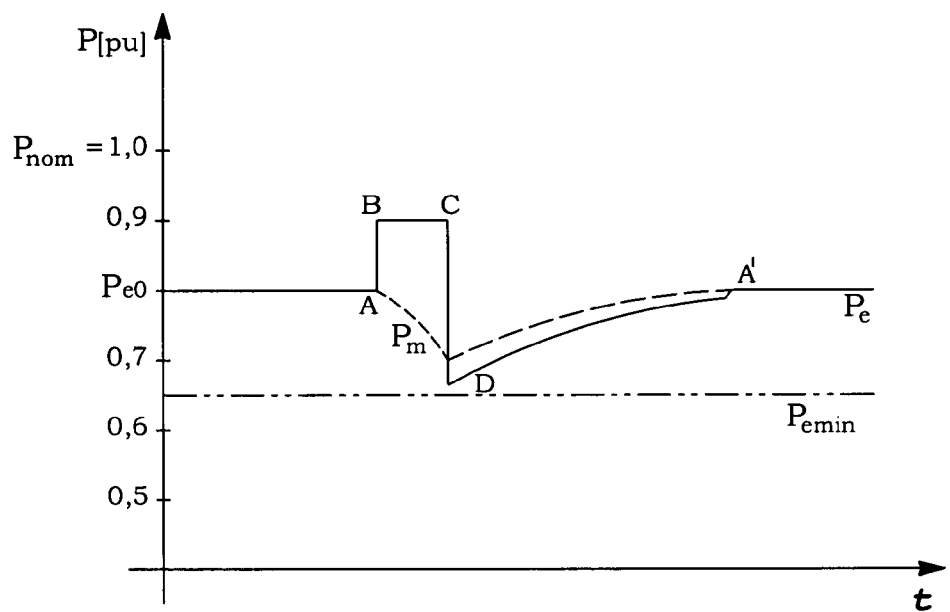
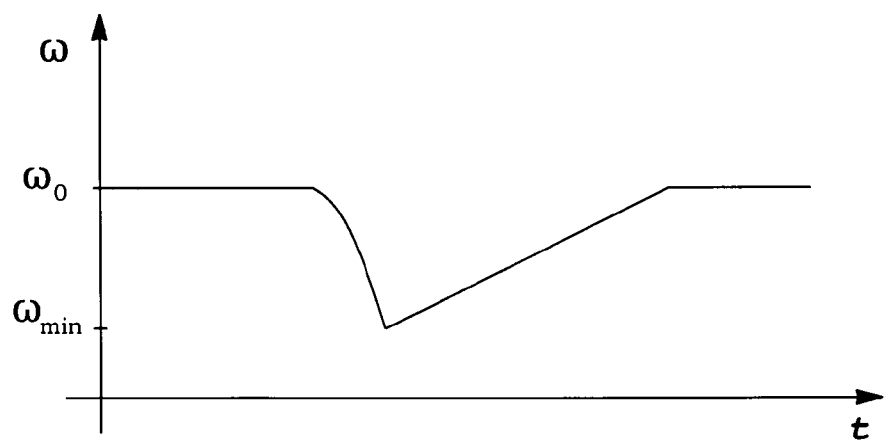

Fig. 5a
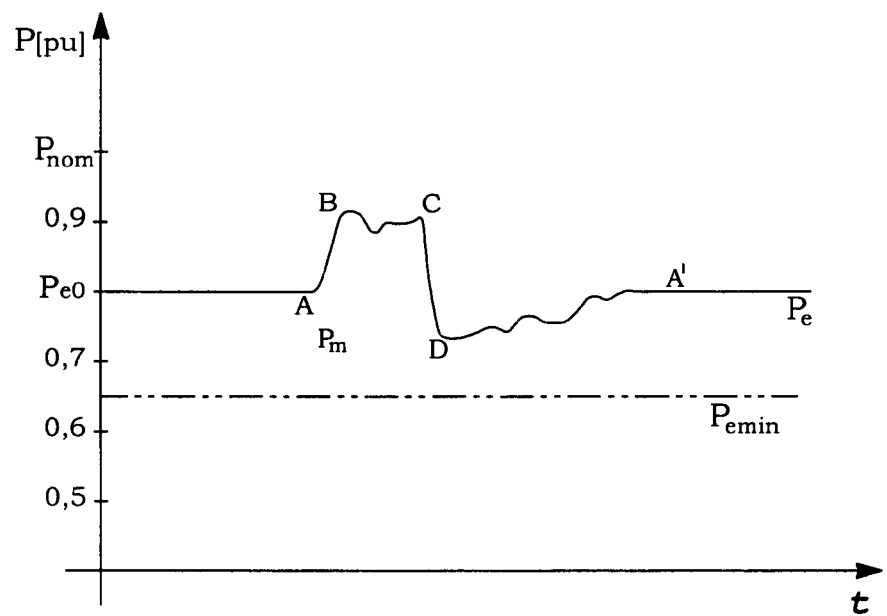
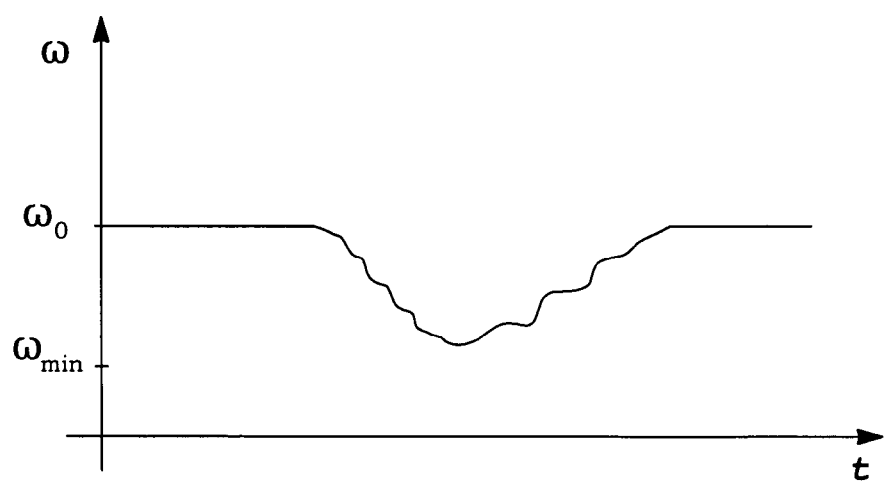

Fig. 7
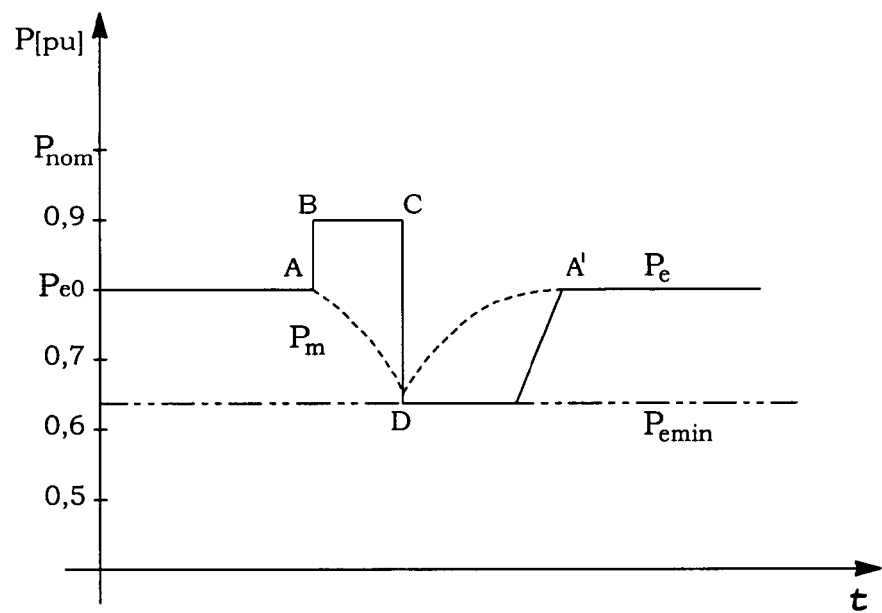
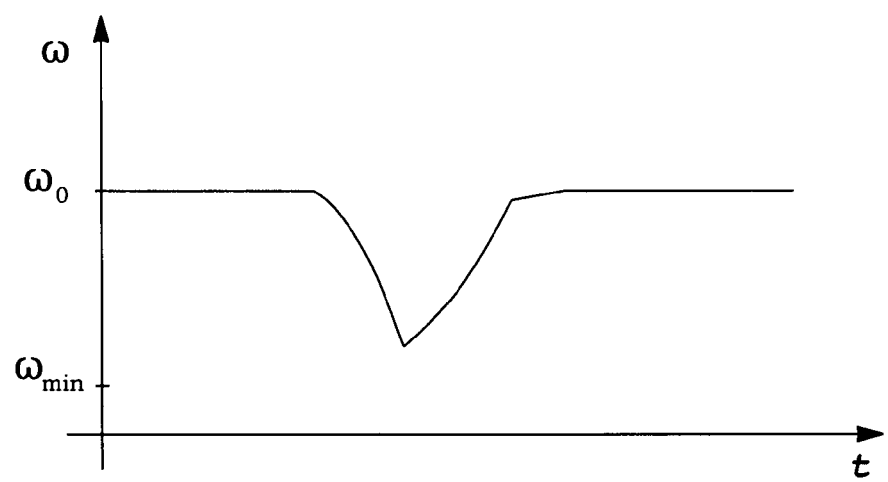

Fig. 8
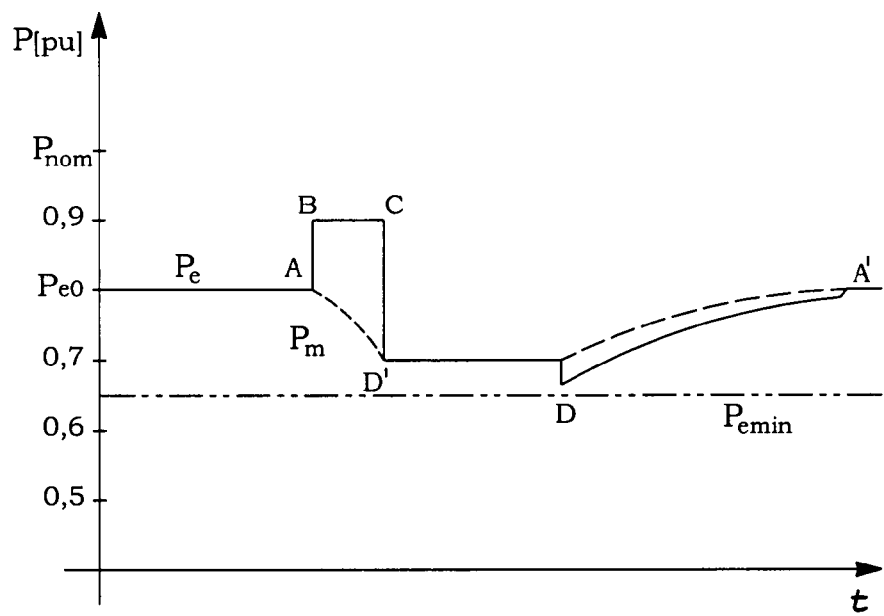
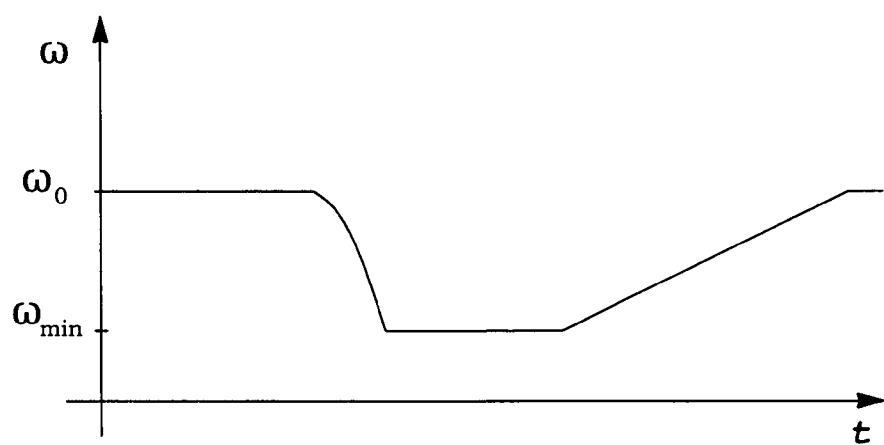

Fig. 9
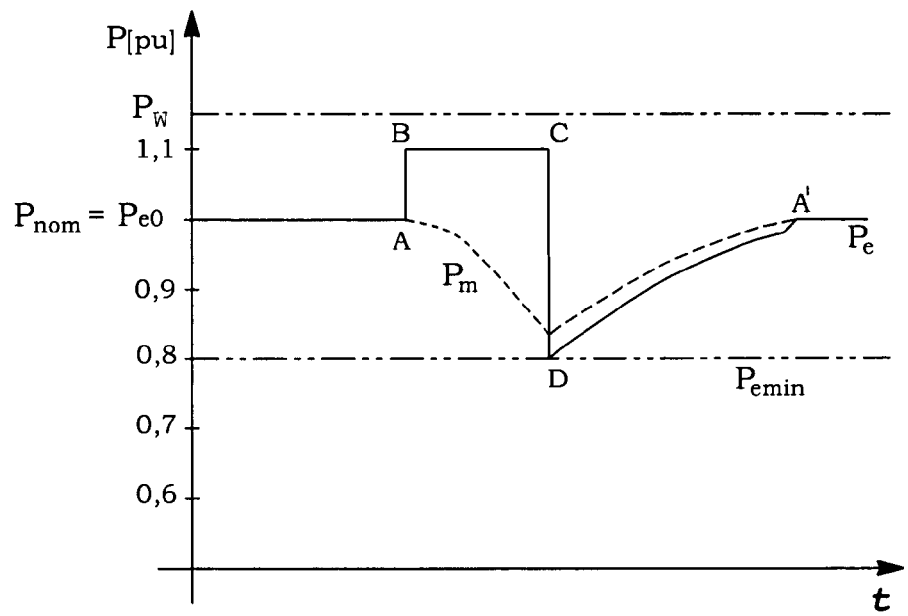
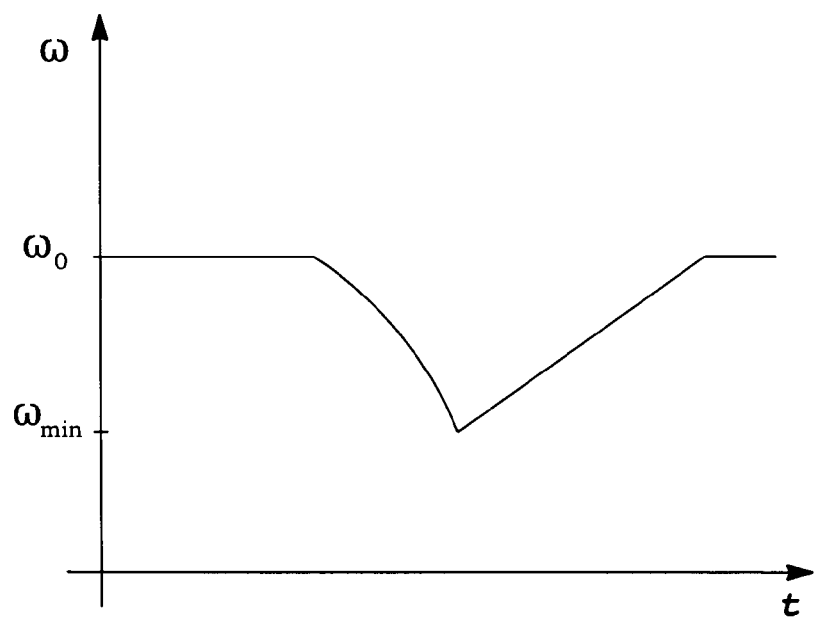

CONTROLLING A WIND TURBINE TO STABILIZE AN ELECTRIC GRID

FIELD OF THE INVENTION

The invention relates to a variable speed wind turbine for connecting to an electric grid and being arranged to generate additional electrical output power on the occurrence of grid disturbances. More particularly, the invention is directed to a wind turbine which is able to further support the stability of the electrical grid after the output of the additional electrical power has finished.

BACKGROUND OF THE INVENTION

Unbalances between the electrical power fed into an electrical grid and the electrical power withdrawn from it lead to fluctuations of the grid frequency. If the electrical power generation drops below the power consumption from an electrical grid, e.g. due to a power plant failure or disconnection, the grid frequency drops. Conversely, if the power consumption falls below the amount of electrical power generation, the grid frequency increases. In order to compensate for such frequency fluctuations, there are power generating stations which are arranged to continuously vary their active electrical power output until the unbalance has been eliminated. This electrical output power variation is called "primary power control". Grid operators specify the primary power control requirements in so-called Grid Codes as, for example, the Grid Code 2006 by E. ON Netz GmbH, English version, published by E. ON Netz GmbH, downloadable at http://www.eon-netz.com/pages/ene_de/Veroeffentlichungen/Netzanschluss/Netzanschlussregeln/ENENAR HS2006eng.pdf.

Currently, wind turbines generally do not contribute to primary power control, mainly because the power source "wind" is not controllable. However, with the increasing proportion of wind energy plants in the overall electrical power production, a contribution of wind turbines to primary power control is desired.

Also, mechanical rotating parts of the energy conversion system of modern variable speed wind turbines are not electrically coupled to the electricity network, thus the wind turbine is mechanically decoupled from the grid, differently to conventional fixed speed synchronous generators. In this way, modern wind turbines do not have an inherent contribution to the grid stability when a grid event is experienced, such as sudden imbalances between total generation and consumption in the network (due to generator trip or load trip), differently from conventional fixed speed synchronous generators. Such wind turbines are thus not contributing with the grid rotating inertia. With the increasing proportion of wind energy plants in the overall electrical power production, the number of fixed speed synchronous generators is decreasing, thus loosing the inherent capability of generation mix to support grid stability when a grid event is experienced such as sudden imbalances between total generation and grid consumption. The total grid inertia is decreased, deteriorating the grid frequency stability. A contribution of wind turbines with fast controlled active power modulation for grid stability is desired.

It is known, for example from DE 100 22 974 A1, that wind turbines can react to grid frequency increases (i.e. less power is consumed from the electrical grid than is fed into it) by decreasing their output power. It is, however, hard to respond to frequency decreases (i.e. more power is consumed from the electrical grid than is fed into it) because that means increasing the active electrical power production without having more wind energy available. Two different approaches are known to address this issue:

Firstly, two papers by Harald Weber et al. from Rostock University ("Netzregelverhalten von Windlcraftanlagen", published at the conference 6$^{th}$ GMA/ETG-Fachtagung "Sichere und zuverlässige Systemführung von Kraftwerk und Netz im Zeichen der Deregulierung", held from 21 to 22 May 2003 in Munich, downloadable at www.e-technik.uni-rostock.de/ee/download/publications_EEV/uni_hro_publ35_WKA_2003.pdf; "Primärregelung mit Windlcraftanlagen", published at the ETG-Workshop "Neue dezentrale Versorgungsstrukturen", held from 19 to 20 Feb. 2003 in Frankfurt/Main, downloadable at www.e-technik.uni-rostock.de/ee/download/publications_EEV/uni_hro_publ33_etg_frankfurt_2003.pdf; both documents are hereinafter referred to as the "Rostock papers") recommend the operation of a wind turbine at a suboptimal working point (e.g. at a higher than optimal rotational rotor speed, at a given wind speed) in order to have power reserves available which can be additionally output in the case of a frequency drop (e.g. by then lowering the rotational rotor speed to the optimal speed, at a given wind speed). By this, the additional electrical output power can be fed into the grid over an indefinite time.

According to the second approach, which is for example outlined in WO 2005/025026 A1, the kinetic energy stored in a wind turbine's rotor is identified as a power reserve that can be transformed into electrical power and additionally injected into the grid, however, only over a short time period. By using kinetic rotor energy, it is also possible to compensate periodic frequency oscillations, by periodically de-accelerating and accelerating the rotor, in synchronisation with the frequency oscillation.

A similar concept for short-time power input at the cost of kinetic rotor energy is provided by the article "Temporary Primary Frequency Control Support by Variable Speed Wind Turbines—Potential and Applications" by Ullah et al. (published by IEEE in "IEEE Transactions on Power Systems, Vol. 23, No. 2" in May 2008, pages 601 to 612, downloadable at ieeexplore.ieee.org/iel5/59/4494587/04480153.pdf; hereinafter referred to as "ULLAH").

These proposals for using kinetic energy from the rotor to temporarily output additional electric power are, however, not yet matured as said documents are not concerned with wind turbine controlling after a non-periodic additional electrical power output has ended. The present invention provides a refined approach for a fast active power variation for grid stability and primary power control contribution by wind turbines.

SUMMARY OF THE INVENTION

According to a first aspect, the invention provides a variable speed wind turbine for connection to an electrical grid. The wind turbine is arranged to provide additional electrical power to counteract non-periodic disturbances in the electrical grid. It comprises a rotor with blades coupled to an electrical generator and a controller which monitors events indicating a need to increase the electrical output power from the wind turbine to the electrical grid to support the stability of the electrical grid. The controller is arranged to control the wind turbine to perform grid-stability supporting activity, in a non-periodic manner, as follows: After an indicating event has been detected, the wind turbine enters an overproduction period in which the electrical output power is increased beyond the normal electrical operating power, wherein the additional electrical output power is taken from kinetic energy stored in the rotor and without changing the operation of the wind turbine, when working in at least a partial-load mode, to a more efficient working point. At the latest, when the rotational speed of the rotor reaches a minimum value, the wind turbine enters a recovery period to re-accelerate the rotor to the nominal rotational speed while further contributing to the stability of the electrical grid by outputting at least a predetermined minimum electrical power to the electrical grid.

According to a second aspect, the invention provides a controller arranged to control a variable speed wind turbine accordingly.

According to a third aspect, the invention provides a corresponding method of controlling a wind turbine for providing additional electrical power.

Further aspects are set forth in the dependent claims, the following description and the drawings.

BRIEF DESCRIPTION OF THE DRAWINGS

Embodiments are explained by way of example with respect to the accompanying drawings; in which:

FIG. 5 illustrates the developing of the electrical output power, the available mechanical blade power and the rotor speed according to the first embodiment;

FIG. 5a is a schematic illustration of the first embodiment according to FIG. 5, wherein the electrical output power is modulated during the overproduction and recovery period;

FIG. 7 is a diagram showing the characteristics of the electrical output power, the available mechanical blade power and the rotor speed according to the second embodiment;

FIG. 8 shows the electrical and mechanical power curves as well as the rotor speed according to a third embodiment;

FIG. 9 illustrates the correlation between rotational speed of the rotor and the electrical output power in a situation in which the available wind power is higher than the nominal electrical power of the wind turbine (full-load operation);

NOMENCLATURE

Figure 1:
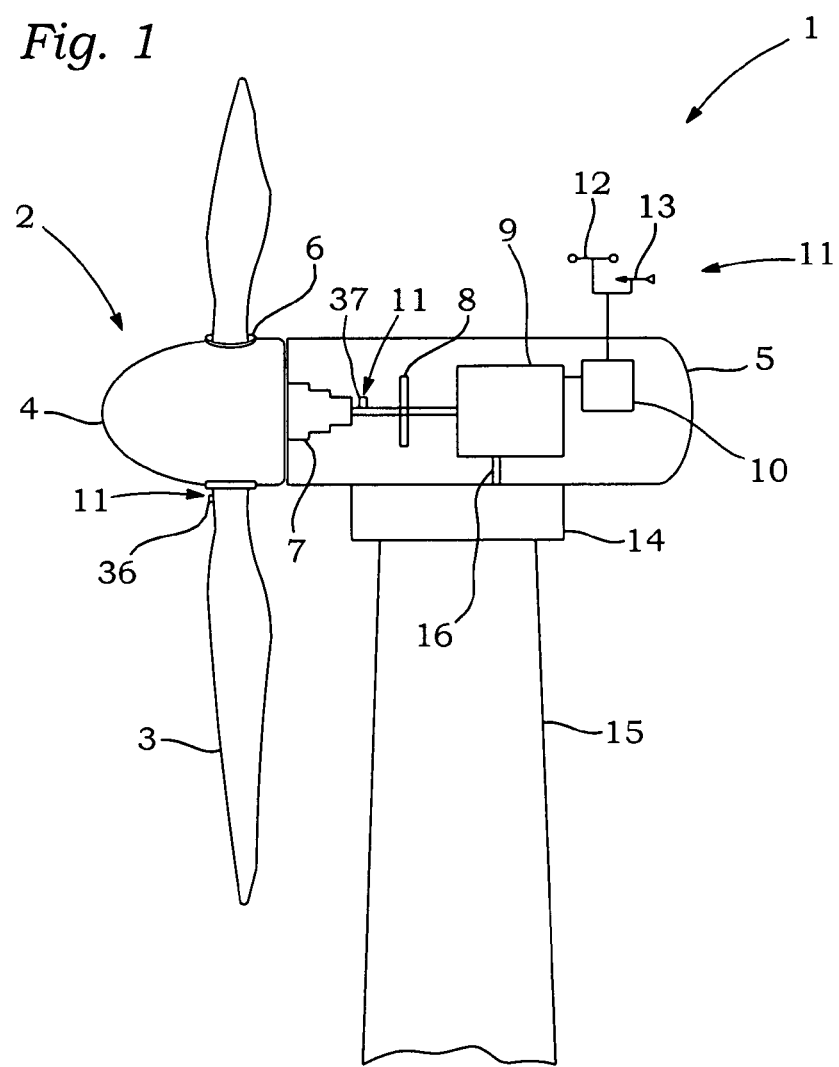
FIG. 1 schematically shows an assembly of a variable speed wind turbine.

The following terms and abbreviations are used throughout this specification:

$P_{nom}$: is the nominal (rated) electrical operating power of the wind turbine according to the invention (when referring to "power", we mean the physical unit with the dimension energy/time or work/time);

$P_e$: is the actual electrical operating (output) power at a certain point in time;

$P_{e0}$: stands for the (normal) wind turbine's electrical operating power at the moment of entering the power control mode according to the present invention;

$\Delta P_{op}$: is the overproduction power which is output in addition to the normal electrical operating power of the wind turbine during the overproduction period;

$P_{emin}$: designates the predetermined minimum electrical output power during the recovery period;

$P_{acc}$: stands for the power used for re-accelerating the rotor during the recovery period according to the present invention;

$P_w$: denotes the available wind power at a certain point in time;

$P_m$: stands for the wind turbine's mechanical rotor power at a certain point in time;

$\omega_0$: designates the rotational speed of the wind turbine's rotor at the moment of entering the power control mode according to the present invention;

$\omega_{min}$: is the minimum rotational speed of the wind turbine's rotor at which the wind turbine enters the recovery period.

DETAILED DESCRIPTION

Before turning to the detailed description of the embodiments, a few general items will first be discussed.

The main components of the wind turbine according to the invention are a rotor with blades which is coupled to an electrical generator and a controller which is arranged to control the wind turbine to perform grid-stability supporting activity. The wind turbine is a variable speed wind turbine, i.e. the rotor speed can be varied during ongoing operation in order to permit the efficient exploitation of the available wind power while minimising wind turbine load and abrasion. It is further arranged for connection to an electrical grid which is, for example, a three-phased public power supply network or, if the wind turbine belongs to a wind park, the wind park's internal electrical voltage network (which itself may, in general, again be connected to a public power supply network). To enable the wind turbine to be operated with variable rotor speeds, it is mechanically decoupled from the fixed grid frequency, e.g. by an electric converter or a variable-speed gearbox between rotor and generator.

During operation in partial-load mode (i.e. the available wind power is below the wind turbine's rated wind power), the wind turbine generally operates at an optimal working point. Depending on the wind speed and direction, the rotor speed as well as pitch and yaw angles (assuming that the wind turbine is equipped with blade pitch and yaw control systems) are continuously adjusted so that maximum aerodynamic efficiency is maintained (e.g. the wind turbine's tip-speed ratio is maintained at optimal value) and maximum electrical power is captured from the wind conditions (this policy is usually called "maximum power tracking"). If the available wind power reaches or exceeds the wind turbine's rated wind power, rotational rotor speed and the electrical operating power are limited to their nominal values by, e.g., controlling the blades' angles of attack using a blade pitch control system. The wind turbine is thereby protected against overload while the generated electrical power is kept constant at its rated value ($P_{nom}=P_e$). Hence, only in this so-called full-load mode, the available wind power is not exploited as well as possible, but the electrical output power is limited by turning the blades out of the wind to a certain extent.

The "Rostock papers", however, propose a wind turbine operation deviating from this. In order to have a power reserve available for primary power control, a wind turbine shall generally be operated in a non-optimal manner. This could be realised by driving the rotor at a higher or lower rotational velocity or by turning the blades to a suboptimal pitch angle (cf. "Netzregelverhalten von Windkraftanlagen", p. 6). Such a systematic operation off the optimal working characteristic curve, however, causes significant waste of available wind energy. From an economic point of view, this is problematic because—unlike power plants based on controllable energy sources like water or gas plants where the unspent—and thus saved—amount of the energy carrier can be converted to electrical power at later times—non-exploited wind energy is simply lost. Thus, the approach suggested by the "Rostock papers" is not followed here, but the wind turbine according to the invention operates on its normal torque-speed characteristic curve, at least when working in partial-load mode.

As outlined by ULLAH and WO 2005/025026 A1, it is possible to provide additional output power—even if the wind turbine is operated at its optimal working point—by extracting kinetic energy from the rotating rotor. According to ULLAH, it is for example possible to output an additional level of electrical power—which is appropriate for contributing to grid frequency maintenance—for about 10 seconds (in contrast to classical primary power control where the additional electrical power is generated from available power reserve and can, thus, be generally maintained over a long time). This transient and occasional power increase is also called "grid inertia response". The extraction of kinetic energy will lead to a deceleration of the rotor and thus generally causes a deviation from the optimal operating point for the time of the frequency stability contribution (ULLAH, p. 608, r. col.). After the period of additional electrical power output (which is called "over-production period" hereinafter) the electrical output power is rapidly decreased and power may even be consumed from the electrical grid so that the rotor can be accelerated again (p. 609, l. col.). However, this rapid power decrease causes a second grid frequency drop (cf. FIGS. 17(a), 18 and 19) so that—after the initial short-term inertia response—subsequent frequency stabilization is not provided.

The present invention focuses on wind turbine control in the phase after the overproduction period has been ended and until the rotor has been re-accelerated to its normal speed (this period is called "recovery period" hereinafter). It provides a wind turbine arranged for contributing to primary power control in a way that the stability of the electrical grid is further supported during the recovery period.

WO 2005/025026 A1 pursues the same approach as described by ULLAH and additionally mentions the utilisation of the rotor's kinetic energy for dampening periodic grid frequency oscillations (so-called "Inter Area Oscillations", WO 2005/025026 A1, p. 14). In a given example, the grid frequency oscillates with a characteristic frequency of 0.22 Hz (equal to a cycle duration of 4.5 s) which means that for dampening this oscillation the wind turbine injects additional power for 2.25 s and reduces power output for another 2.25 s in an alternating manner (p. 14 and FIG. 3). In this scenario, the significant electrical output power reduction following the increase beyond the normal operating power is intended (because the grid frequency is above nominal for the respective half of the cycle) so that there is no need to counteract an ongoing frequency valley.

In contrast to this, the present invention is conceived to counteract non-periodic disturbances in the electrical grid. In particular, if the grid frequency drops for longer periods due to longer-term increased power consumption from the electrical grid or shutdown/failure of another power plant, the wind turbine operated according to the present invention is capable of providing additional electrical power in a transient manner and still contributing to the grid stability after the additional electrical power generation has ended.

In particular, the wind turbine according to the present invention is arranged to perform a two-phased ancillary control mode, the first phase being an overproduction period in which the electrical power supplied from the wind turbine to the electrical grid is increased beyond the normal electrical operating power, and the second phase being a recovery period in which the wind turbine further contributes to the stability of the electrical grid. This further contribution is achieved by outputting an amount of electrical power which is at or above a predetermined lower threshold. In this way, a (second) significant decrease of the grid frequency, as occurs in ULLAH, can be diminished.

The wind turbine according to the invention comprises a controller which is responsible for controlling the wind turbine's entry into the two-phased control mode. For this purpose, the controller (continuously or periodically) monitors events which indicate that the output of electrical power to the grid shall be increased beyond the normal, i.e. present electrical operating power $P_e$. Such an indicating event can, for example, be a control signal generated by a wind turbine-external entity such as the grid operator or a wind park controller. Alternatively, it can be an alarm triggered by a wind turbine-internal measurement of operating parameters, such as the grid frequency or voltage angle change and, in particular, the determination of an operating parameter deviation from its normal value to a predefined extent. The indicating event can include not only the indication that an electrical output power increase is needed, but also further information about the nature of the required power increase. For example, it could contain information about the magnitude of the power increase (as a relative or absolute value), the magnitude of the respective frequency drop, the desired duration or variation of the electrical output power increase or other/additional management or meta data. The controller can then be arranged to evaluate and process this information and to initiate corresponding control activities.

In particular, after detection of an indicating event, the controller initiates a grid-stability supporting activity, starting with the overproduction period. During this time the stability of the grid is supported by outputting electrical overproduction power ($\Delta P_{op}$) on top of the normal electrical operating power which was being produced at the time of the start of the overproduction period ($P_{e0}$). Hence, the electrical output power during the overproduction period $P_e$ can be specified by $P_e = P_{e0} + \Delta P_{op}$ (assuming that the wind conditions do not change during the overproduction period, and, thus, the hypothetical working point at which the wind turbine would have been operated if it had not entered the overproduction period had been maintained, i.e. $P_e = P_{e0}$ during this time interval). The additional overproduction power $\Delta P_{op}$ can be a predetermined and fixed value (the same value for any overproduction period and unchanged during a complete overproduction period), or variable case by case, but still constant over each overproduction period, or it can be varied during an overproduction cycle, for example in response to further events monitored by the controller or other management data (which could have been, for example, provided together with the indicating event), so that by modulation of the electrical output power the wind turbine is able to contribute to the stability of the electrical grid depending on the nature and characteristics of the grid instability.

The overproduction power $\Delta P_{op}$ is, at least when the wind turbine operates in partial-load mode, not generated by changing the wind turbine operation to a more favourable working point, but is extracted from the kinetic energy stored in the wind turbine's rotating masses, i.e. its rotor. Accordingly, the rotor speed decrease during the overproduction period is dependent on the amount of energy extracted.

The considerations laid out herein are based on the assumption that the available wind power ($P_w$) stays constant during the two-phased ancillary control mode. On that assumption, the decrease of rotor speed during the overproduction causes the wind turbine to deviate from the optimal working point, accepting a (relatively slight) loss of efficiency (which means that, in fact, the wind turbine operation is just converse to the "Rostock papers": normal operation at a working point with maximum efficiency, a (negative) deviation from the normal working point only occurring while performing grid-stability support activity during the two-phased ancillary control mode). If the wind turbine is equipped with a blade pitch control system, the efficiency decline can partly be compensated by adjusting the pitch angle of the rotor blades while the rotor speed changes.

The rotor speed, however, shall not decrease below a certain minimum value. This threshold can be related to construction parameters of the wind turbine, e.g. the operating range of the wind turbine's generator or converter, or to efficiency considerations, in particular, to the minimum electrical power that should be output to the electrical grid during subsequent operation. At the latest, when the rotational rotor speed reaches this minimum value, the controller terminates the overproduction period and initiates the recovery period.

The recovery period is characterised by two tasks which are basically contrary to each other. On the one hand, the electrical grid may still not be stable (i.e. there is still more power consumption from the grid than is being fed into it) so that the need for a certain electrical output power is still present. On the other hand, due to the decreased rotor speed, the wind turbine is operating at a suboptimal working point and can therefore not generate as much electrical power as prior to the overproduction period. Hence, there is a conflict between the medium-term electrical grid stability and the re-acceleration of the rotor for efficient long-term power production.

According to the present invention, in this second phase of the ancillary control mode, the wind turbine outputs at least a predetermined minimum of electrical power ($P_{emin}$) to the electrical grid. That means that the electrical output power $P_e$ does not drop below this predetermined threshold $P_{emin}$ over the complete duration of the recovery period (ergo, at any point in time during the recovery period the electrical output power is at or above the predetermined minimum value). In that way, the wind turbine continues to contribute to the stability of the electrical grid. At the same time, the rotor is re-accelerated again by using remaining mechanical power of the rotor ($P_{acc}$). That means that, in general, not the complete mechanical rotor power ($P_m$) is converted to electrical power ($P_e$) during the recovery period. Depending on the apportionment of the available mechanical rotor power ($P_m$) into the part used for generating electrical output power ($P_e$) and the part used for rotor re-acceleration ($P_{acc}$), the re-acceleration may take a significant amount of time. It is, for example, possible that—for a certain period of time—the complete supply of mechanical rotor power ($P_m$) is converted into electrical output power ($P_e$) and the rotor is not accelerated at all so that the recovery period may additionally be prolonged.

The overproduction and recovery periods constitute a non-periodic control mode. As the focus is here on grid stability (opposed to quick rotor re-acceleration), the recovery period will generally be longer than the overproduction period. Furthermore, after the recovery period has ended, there will generally be a phase of normal wind turbine control and operation for an indefinite time. Only when the controller detects another indicating event (which can, from the perspective of the wind turbine, occur at any arbitrary point in time) the controller initiates another overproduction phase. Thus, there is no continuous process such as alternating overproduction and recovery periods or re-entering an overproduction phase after a predetermined interval following the previous recovery period.

The minimum value of electrical output power ($P_{emin}$) during the recovery period could theoretically be determined as an absolute power value. However, as wind turbines operate under varying wind conditions and, accordingly, the wind turbine according to the invention also performs the grid-stability supporting activity under varying wind conditions, this might not be useful in practice. Therefore, in some optional further configurations of the invention, $P_{emin}$ is defined as a fixed percentage of the electrical operating power which was being supplied to the electrical grid at the moment the turbine entered the overproduction period ($P_{e0}$). In other variants, other reference values are chosen, for example an average value of the operating power within a certain time window before the initiation of the overproduction period, the wind turbine's nominal electrical operating power ($P_{nom}$) or the normal electrical power corresponding to the currently available wind power (in the recovery period).

In some further configuration options, the minimum electrical output power ($P_{emin}$) during the recovery period amounts to 80% of the electrical operating power which was supplied to the electrical grid prior to the overproduction period ($P_{e0}$)). In other embodiments, the threshold is set to 85% or 90% of $P_{e0}$. It is possible to choose an even higher value, for example 95% of $P_{e0}$. The electrical grid is then supported at a higher level during the recovery period. However, the remaining power available for rotor re-acceleration is then correspondingly smaller so that the recovery is prolonged and the wind turbine operates at a suboptimal working point for a longer time.

In some further configurations, the controller is arranged not only to ensure that the electrical output power does not drop below the predetermined minimum during the recovery period, but also to control the power used for re-acceleration of the rotor ($P_{acc}$). As a result, the controller can make sure that the rotor acceleration does not fall below a certain minimum value. Furthermore, it is thereby possible to (continuously or periodically) estimate the remaining duration of the recovery period.

In order to be able to control the rotor acceleration power ($P_{acc}$), the wind turbine comprises sensor equipment for measuring the rotational speed of the rotor and the wind speed, the moment at the blade roots and/or the torque at the rotor shaft in some optional configurations of the present invention. The rotor acceleration can then be controlled by the controller by (continuously or periodically) measuring these parameters and by calculating the available mechanical rotor power ($P_m$) from at least these measured parameters. Thus, the controller always "knows" the available mechanical power and is able to segment it into the two parts during the recovery period, namely the first part which is used for conversion to electrical output power and which ensures that the output power does not fall below the given lower threshold, and the second part which is used for re-acceleration of the rotor to its nominal speed. As a result, more specific prognoses concerning the remaining duration of the recovery period are possible.

The overproduction period does not need to last until the predetermined minimum rotational rotor speed ($\omega_{min}$) has actually been reached. For example, when the electrical grid quickly regains its stability, the recovery period can be initiated sooner as there is no need for injecting increased electrical power to the electrical grid anymore. Also, there may exist a predetermined time limit for the duration of the overproduction period in order to protect the wind turbine from a too extended increased electrical power production (e.g. to prevent overheating of power conversion components). Thus, when such a time limit for increased electrical power production is reached, the recovery period may also be initiated prior to reaching the minimum rotational rotor speed ($\omega_{min}$). Another (additional) condition for entering the recovery period could be an upper limit of the amount of additional energy provided to the electrical grid during the overproduction period. Finally, the wind turbine may be arranged to abort the increased electrical power production and to enter the recovery period in response to control signals or external events, e.g. stipulations received from the grid operator or a superordinate control entity.

Furthermore, in some variants, a time period is set in which the rotor speed regains its nominal speed (which marks the end of the recovery period). The controller can then vary both, rotor acceleration and electrical output power ($P_{acc}$ and $P_e$), so that the electrical output power may not only be modulated during the overproduction period (as mentioned above), but also during the recovery period in order to enable the wind turbine to contribute to the grid stability in alignment with the characteristics of the instability (for example, in response to control signals provided by grid measurements or the electrical grid operator), as long as both prerequisites (minimum electrical power value and time limit for reaching normal rotor speed) are complied with. The above-mentioned rotor and wind speed, moment and torque measurements and mechanical rotor power calculations can be used to ensure that these constraints are met.

In some further configuration options, the controller is arranged to control rotor speed and/or the electrical output power according to a predetermined (mathematical) function or a control algorithm suitable for grid stability. Preferably, both parameters are increased according to a predetermined gradient. The gradient does not need to be constant or uniform during the overall recovery period. It is, for example, possible that during a first section of the recovery period, the electrical output power ($P_e$) is not increased at all (but, e.g. is equal to the predetermined minimum value) and only the acceleration power ($P_{acc}$) is increased. The additional power which is gained as a result of increasing efficiency while increasing the rotor speed is, in this example, completely invested into the rotor acceleration so that (assuming constant wind speed) the rotor acceleration increases further and further. Only in a second section of the recovery period, $P_e$ is increased so that the rotor acceleration may not further increase (and could even decrease again). In this way, the recovery period could be kept relatively short. It is also possible that both parameters are controlled and increased in a non-linear manner, for example depending on the wind turbine's efficiency curve. Further, the controller may be arranged to control the electrical output power to provide a soft transition between overproduction period and recovery period. That means that at the end of the overproduction period, the electrical output power is not reduced abruptly, but the reduction takes a certain amount of time. By such a "smooth" transition, negative impacts on the electrical grid and/or the wind turbine can be avoided.

Generally, the recovery period will be of longer duration than the overproduction period. In the overproduction period, the electrical output power is increased, for example in response to information contained in the indicating event such as the magnitude of a frequency drop, the frequency gradient or terminal voltage angle, or to further control signals received by the controller during the ongoing overproduction period. The longest possible duration of the overproduction period generally depends on the kinetic energy stored in the rotor and the minimum rotational rotor speed. A feasible duration could, for example, be 10 seconds. In order to continue to contribute to the grid stability during the recovery period, it is generally not practicable to re-accelerate the rotor to its normal speed within the same (relatively short) time frame. On the other hand, the recovery period should not be too extended either, as the wind turbine operates with a suboptimal efficiency during this time frame. Thus, in some further configuration options, the recovery period is preferably five times longer than the overproduction period. In other variants, the factor is only three, and in still other configurations, the recovery period is twice as long as the overproduction period.

In some optional further configurations, the wind turbine comprises a pitch-control system. The controller is then arranged to adjust the pitch angle of the rotor blades during the overall ancillary grid-stability support mode to mitigate the efficiency reduction of the electrical output power generation which is caused by the deviation from the normal operating point. In particular, the rotor blades can be adjusted during the overproduction period so that the suboptimal angle of wind attack (which is caused by the rotor deceleration) is compensated. As an effect, the rotor deceleration might be reduced to some extent. Accordingly, during the recovery period, the pitch angles can be adjusted while the rotor re-accelerates so that, again, the angle of wind attack is adjusted to the increasing rotor speed. Of course, the pitch-control system can also respond to other changing factors not related to the specific grid-stability support mode such as changing wind speeds and/or directions.

Unlike to the operation in partial-load mode, in which the wind turbine generally operates at an optimized working point, in full-load mode (i.e. when the available wind power $P_w$ correlates to an electrical operating power $P_e$ above the wind turbine's nominal operating power $P_{nom}$) wind turbine control limits the turbine's operating power. This is accomplished, for example, by turning the rotor blades into the wind, i.e. into the direction of the flag position so that the blades are at least partially in a flag position (The "flag position" is the blade position in which the angle of wind attack is zero. A "partial flag position" means that the blades are in a position between the optimal angle of wind attack and the flag position so that the angle of wind attack is smaller than normal. The term "flagging" designates the degree to which the blades are turned into the direction of the flag position.). That means that the angle of wind attack and, as a consequence, the lifting forces are reduced (in comparison with blade positioning in partial-load mode) which results in the desired electrical output power limitation. In some further configurations of the invention, when the wind turbine is operating in a full-load mode, the pitch system is used during the overproduction period to reduce the amount of flagging of the blades (i.e. to re-increase the angle of wind attack). By this additional measure, the lift forces at the blades are increased so that the additional available wind power output is utilized for the ancillary control mode. This additional support can, for example, be used to increase overproduction power ($\Delta P_{op}$) and/or to slow down rotor deceleration and thus to extend the overproduction period. Accordingly, during the recovery period, it can be applied to increase electrical output power and/or to increase rotor re-acceleration, i.e. to increase the acceleration power ($P_{acc}$), to shorten the recovery period.

For the connection of the variable speed wind turbine to an electrical grid, the frequency of the wind turbine's electrical sub-system and the electrical grid are decoupled. In general, there are two ways of achieving this. Firstly, the wind turbine's generator can be completely decoupled from the electrical grid by the usage of a full-scale frequency converter. The generator then produces AC of variable frequency, which is rectified by a rectifier, and the resulting DC is then converted to AC with the generally constant grid frequency (50 Hz in Europe). The second alternative is a Doubly-Fed Induction Generator (DFIG). Here, the (asynchronous) generator's stator winding is directly connected to the network, i.e. a converter is not used for this connection. The exciting field produced by the generator's rotor rotates relative to the generator's rotor with a variable speed. The (variable) rotor speed is compensated by correspondingly adjusting the speed of the exciting field relative to the rotor. As a result, the sum of the two speeds, i.e. the speed of the exciting field relative to the stator is always a constant value adapted to the fixed grid frequency. A converter is here only needed to produce the exciting-field currents (=the rotor currents) with variable frequencies.

Accordingly, in some further configurations of the invention, the wind turbine's electrical generator is a generator having a full-scale converter. In this solution, a synchronous generator is often used. Due to the complete decoupling by the full-scale converter, the wind turbine's minimum rotor speed ($\omega_{min}$) at which the controller initiates the recovery period is not limited by the wind turbine's grid connection. Rather, the limitation is (only) set by the minimum electrical output power which the wind turbine (at least) maintains during the recovery period and the additional mechanical power ($P_{acc}$) which is needed for rotor re-acceleration.

In other configurations of the wind turbine, a DFIG is used. Here, the operation range of the converter may be limited by the generator's rotational speed so that the rotational speed of the generator's rotor (and thus the rotational speed of the wind turbine's rotor) may not be decreased indefinitely while the wind turbine is supposed to generate a certain amount of electrical power. Thus, in these configurations, this construction-dependent lower speed range threshold of the DFIG may apply as an additional threshold for the minimum rotor speed value ($\omega_{min}$) at which the recovery period is initiated (in addition to the criterion of the mechanical power ($P_m$) which is needed to provide both the minimum electrical output power which the wind turbine maintains during the recovery period and the desired rotor re-acceleration). The criterion at which the wind turbine operation arrives first during the overproduction period (i.e. the higher of the two values) defines the latest end of the additional electrical power output.

The above considerations were generally based on the assumption of constant wind power during the overproduction and recovery periods. Changes in the wind speed will have additional impacts on wind turbine operation during the ancillary grid-stability support mode according to the invention. For example, a decrease in wind speed during the overproduction phase may cause an earlier arrival at the predetermined minimum rotor speed so that actually less electrical work will be output to the grid (in comparison with constant wind speed), whereas a wind speed increase may have the opposite effect. The value of the minimum rotor speed ($\omega_{min}$) could also be determined in dependence on the wind speed, e.g. dependent on the average wind speed over the overproduction period or another given time window. Furthermore, a decrease in the wind power during the recovery period may lead to a delay in rotor re-acceleration, whereas an increase will enable the wind turbine to re-accelerate the rotor faster in comparison to standard recovery period operation. Wind speed variations may also have impacts on a desired modulation of the electrical output during the overproduction and the recovery period.

The present invention enables wind turbines to contribute more efficiently to electrical grid stability. In particular, as wind turbines can react relatively fast to grid frequency drops (compared, for example, to primary power control by hydro, gas or steam plants) it can be used to bridge the gap until the slower power generation plants step in.

Finally, the invention allows grid operators to calculate or estimate the grid-stability support that can be expected from wind turbines for different conditions of the grid and wind speeds.

FIG. 1 illustrates the assembly of a variable speed wind turbine 1 schematically. It comprises a rotor 2 which powers an electrical generator 9 via a variable speed gear (gearbox) 7. Generator 9 produces electrical power which is supplied to an electrical grid 17 (not shown in FIG. 1) via electrical line 16. A controller 10 is responsible for controlling the wind turbine's 1 sub-systems depending on the environmental conditions like wind speed and direction and electrical power demand.

Rotor 2 comprises a rotor hub 4 and blades 3. In some embodiments, the wind turbine 1 features a pitch control system 6 with which blades 3 can be pivoted around their longitudinal axis. Thus, it is possible, for example, to decrease the wind force having an effect on the blades 3 (torque) by turning them to the wind. The rotational speed of the rotor ω is adjusted depending on the prevailing wind speed (i.e. the wind turbine is a variable speed wind turbine, commonly abbreviated: VSWT). Rotor speeds are, for example, in the range between 10 and 20 revolutions per minute. Connected to the rotor 2 is a gearbox 7 which serves to convert the relatively slow rotational rotor speed ω into a higher rotational speed of the generator's 9 rotor (in other embodiments, the wind turbine 1 does not have a gearbox, but of course is also be arranged to perform grid-stability support activity). Break 8 allows the rotor speed to be decreased, for example, in order to shut down the wind turbine 1. The internal mechanical, electrical and control sub-systems are housed in a nacelle 5 which is mounted on tower 15.

A further component of the wind turbine 1 is, in some embodiments, sensor and measurement equipment 11. For example, an anemometer 12 serves to determine the current wind speed, while a wind vane 13 provides wind direction measurements. Further, a measurement device 36 may be provided for measuring the moment at the root of the rotor blades 3 and measurement device 37 may be provided for measuring the rotor shaft's rotational speed and/or torque. Finally, in some embodiments, yaw drive 14 allows the nacelle 5 with rotor 2 to be adjusted around the vertical (tower) axis according to the prevailing wind direction.

Controller 10 is, for example, arranged as a microprocessor with associated memory which executes control software. In some embodiments, it is arranged as a single component, whereas in other embodiments it is made up of distributed sub-systems, for example, in the form of several microprocessors connected to each other. It is coupled via a bus to the wind turbine's sub-systems, in particular to generator 9, rotor 2, pitch-control system 6, sensor equipment 11, i.e. anemometer 12, wind vane 13 and the measurement devices 36 and 37, and yaw drive 14. Furthermore, it is connected to management system 18 (not shown in FIG. 1).

Figure 2:
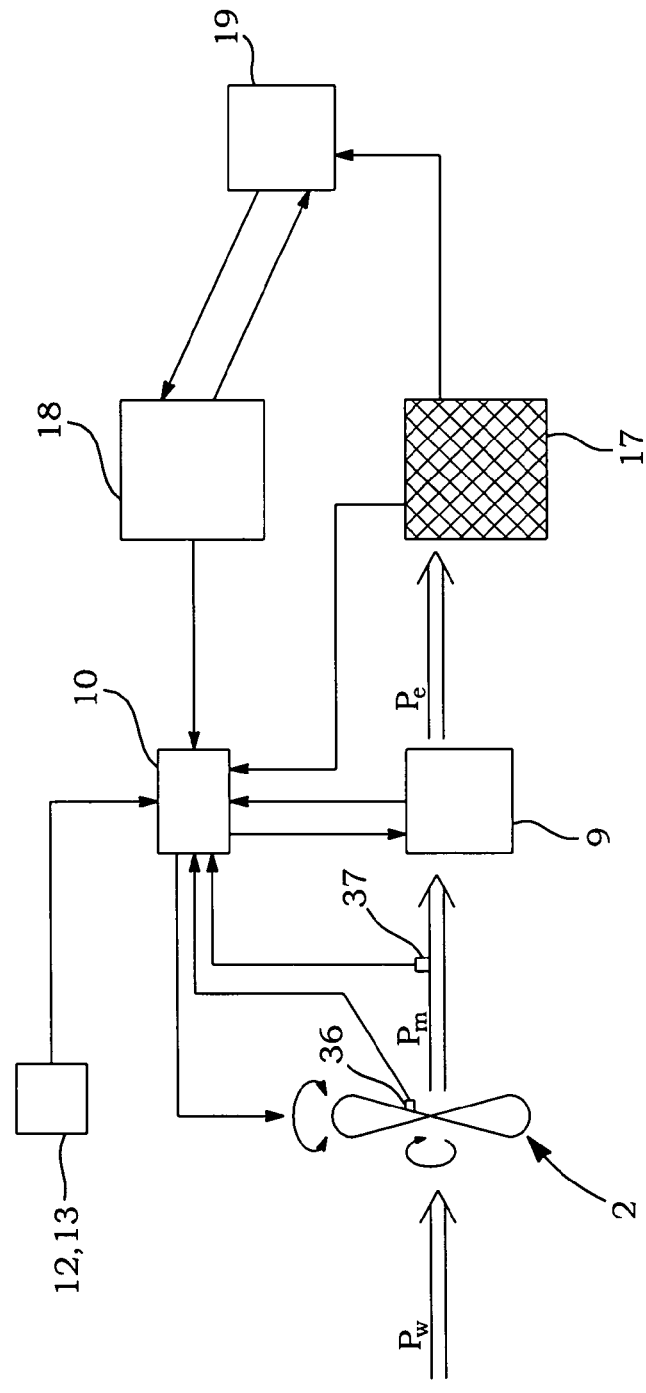
FIG. 2 is a simplified diagram depicting a control flow of the wind turbine.

FIG. 2 exemplarily shows the control flow of the wind turbine 1 in more detail. Controller 10 receives measurement results provided by sensor equipment 11 (anemometer 12, wind vane 13 and the measurement devices 36 and 37) and operating parameters from the electrical grid 17 and generator 9. It processes these input data and generates control signals which are transmitted to actuators of the various sub-systems of the wind turbine 1. The latter execute the control commands received from controller 10 and effect a change of the respective sub-system's state. For example, controller 10 manipulates the rotor speed ω by changing the generator frequency or by varying the gear ratio (control flow of latter manipulation is not shown in FIG. 2).

Furthermore, controller 10 also receives commands from management system 18 which may be located within or outside the wind turbine 1. A remote operation monitoring equipment 19 such as a Supervisory Control and Data Acquisition (SCADA) system is provided to supervise the wind turbine's 1 operation. For this purpose, it requests data about the wind turbine's 1 state from management system 18 and conducts remote parameterization (i.e. commands regarding parameter settings are transmitted to management system 18).

Two tasks performed by controller 10 are of special interest with regard to the various embodiments: Firstly, it is arranged to monitor events indicating a need to increase the electrical output power beyond the normal operating power. Such an indicating event can, for example, be received by remote operation monitoring 19 (via management system 18) or, alternatively, be generated by controller 10 itself, both in response to measurements of electrical grid parameters such as the grid frequency (for example, provided by a grid frequency analyzer, not shown in FIG. 2) or the voltage angle change. Secondly, controller 10 is arranged to initiate the ancillary two-phased control mode according to the present invention.

Figure 3:
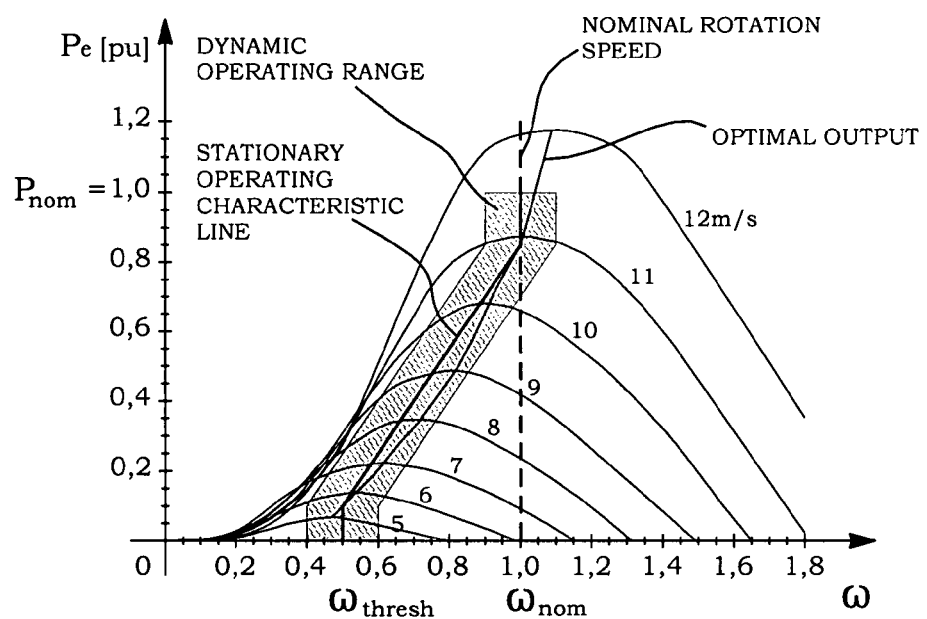
FIG. 3 exemplarily illustrates a wind turbine's production curve.

The wind turbine 1 generates electrical power when the wind speed is within the turbine's operating range. Its (static) production curve which is exemplarily illustrated in FIG. 3 (as thick black line) as a function of rotational rotor speed ω and electrical output power $P_e$ (and considering different wind speeds) is non-linear. Below the lower rotor speed threshold $\omega_{thresh}$, no electrical power is produced. Starting at the lower rotor speed threshold $\omega_{thresh}$, $P_e$ at first increases vertically for low wind speeds. With increasing wind speeds, the rotor speed ω is increased according to the efficiency curves for the different wind speeds until the nominal rotor speed $\omega_{nom}$ is reached. Although rotor 2 is not accelerated further, $P_e$ can still be boosted (again with further increasing wind speed), until the wind turbine's nominal electrical output power has been reached ($P_{nom}$=1.0 pu (i.e. power unit) in FIG. 3). As can be seen in FIG. 3, the production characteristic line deviates from the theoretically possible optimal curve (the thin black line) to some extent. However, as this theoretical curve is not feasible in practice, wind turbine operation on the (thick) production line is considered to be optimal. Depending on the wind turbine's 1 generator type, its operation range is however dynamic to a certain extent (which is marked by the striped area in FIG. 3), i.e. the actual power output $P_e$ and rotational rotor speed ω can deviate to a certain extent from the (optimal) static production line.

Figure 6:
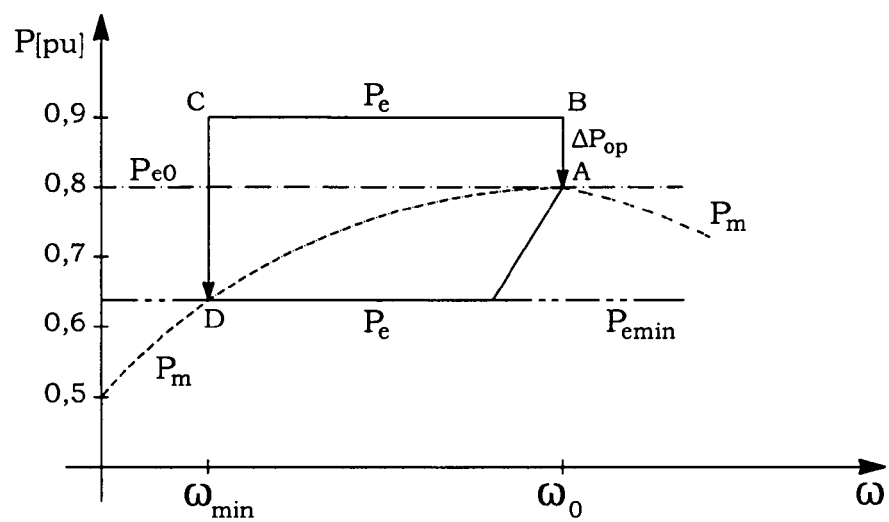
FIG. 6 depicts the correlation between rotational speed of the rotor and the electrical output power according to a second embodiment.

Three embodiments which illustrate different wind turbine operations during the recovery phase will now be described. According to the first embodiment (FIGS. 4 and 5), the rotor is re-accelerated by using a fixed amount of the available mechanical rotor power $P_m$ which effects an increase of the electrical output power $P_e$ from the beginning of the recovery period. The second embodiment (FIGS. 6 and 7) follows a different approach. Here, $P_e$ is at first kept at the minimum level which is required during the recovery period ($P_{emin}$). As a consequence, the power available for rotor re-acceleration increases with the increasing efficiency resulting in a shorter recovery period compared to the first embodiment. The third embodiment (FIG. 8, in combination with FIG. 4) is a specific modification of the first embodiment. In the first phase of the recovery period, all available mechanical rotor power $P_m$ is used for the generation of $P_e$ so that, in this phase, the rotor is not accelerated at all. Only in the second phase, $P_e$ is slightly decreased and the rotor is re-accelerated by using the now available part of $P_m$ in accordance with the scheme presented in the first embodiment. For all embodiments, constant wind speed during the overproduction and recovery periods is assumed.

Figure 4:
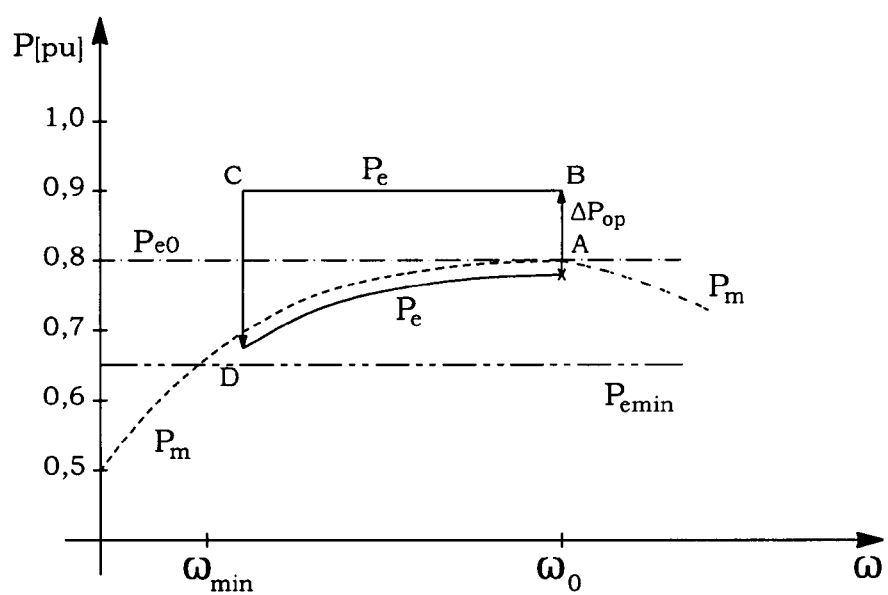
FIG. 4 is a diagram showing the correlation between rotational speed of the rotor and the electrical output power according to a first embodiment.

The values of $P_e$, $P_m$ and ω during the overproduction and recovery periods in the first embodiment are visualized in FIG. 4 ($P_e$ is the solid line, $P_{e0}$ the dash-dot line, $P_m$ the dotted curve and $P_{emin}$ the dash-dot-dot line). During normal operation, the wind turbine operates on the working point with an optimal efficiency, i.e. the operating power $P_e$ and rotor speed ω are set in accordance with its production curve (cf. FIG. 3). When controller 10 detects an indicating event it initiates the ancillary grid-stability support activity according to the invention. At the moment the wind turbine 1 enters the first phase, i.e. the overproduction period, electrical output power and rotor speed correspond to point A in FIG. 4 ($P_{e0}$ and $\omega_0$ wherein $P_{e0}$=0.8 pu in the example of the first embodiment). With the start of the overproduction period, $P_e$ is increased beyond its normal value, shifting the wind turbine's working point to point B in FIG. 4. This additional power is called $\Delta P_{op}$. In the embodiments, $\Delta P_{op}$ is assumed to be constant during the duration of the overproduction period (as outlined above, it could, however, also be varied over time). As $\Delta P_{op}$ is taken from the kinetic energy stored in rotor 2, ω decreases with ongoing output of the increased electrical output power, so that the wind turbine's working point changes from point B to C in FIG. 4. As also indicated in FIG. 4, the mechanical rotor power $P_m$ decreases due to the worsening efficiency that accompanies the decreasing rotor speed (cf efficiency curves in FIG. 3).

Controller 10 continuously measures ω and monitors generator's 9 operation. It stops the increased electrical power output (at the latest) at the moment the respective minimum value $\omega_{min}$ is reached (point C in FIG. 4). The arrow from point C to point D marks the end of the overproduction and the beginning of the recovery period. With the rotational rotor speed being $\omega_{min}$ the available mechanical rotor power $P_m$ is approximately 0.7 pu (as opposed to 0.8 pu in normal wind turbine operation in point A). This reduced amount of available $P_m$ is now the base for re-accelerating rotor 2 while further outputting electrical power to the electrical grid 17 and thus gradually re-shifting the wind turbine's 1 operating point from point D back to point A. In the first embodiment, a constant power amount ($P_{acc}$) is used for rotor re-acceleration, namely ca. 0.025 pu. The remaining part of the available $P_m$ is used for electrical power production (it applies: $P_m-P_e=P_{acc}$, neglecting efficiency curtailment). With increasing rotor speed, the efficiency improves again, and, accordingly, the electrical output power increases (while rotor 2 is still accelerated using the constant $P_{acc}$). During the recovery period, $P_e$ never drops below the predetermined minimum electrical output power which is exemplarily set to 0.65 pu in the first embodiment (i.e. 81.25% of $P_{e0}$). The recovery period ends when the rotor speed arrives again at the nominal speed $\omega_0$, and the wind turbine 1 continues to operate at its normal operating point (point A in FIG. 4).

The first embodiment of the present invention can also be visualized by FIG. 5 (overproduction period: points A through D, recovery period: D to A'). The upper diagram shows $P_e$ (solid line) and $P_m$ (dotted line) over time, whereas the lower diagram depicts the rotational rotor speed $\omega$. As only a relatively small amount of power is invested in rotor re-acceleration, the recovery period is about four times longer than the overproduction period. Due to the constant $P_{acc}$, the rotational rotor speed is increased constantly during the recovery period.

A variation of the first embodiment is shown in FIG. 5a, wherein the electrical output power is modulated during both, overproduction and recovery period. Such modulation is, for example, performed in response to ongoing grid parameter measurements which results are transmitted to via management system 18 to controller 10, based on stipulations by the grid operator (which are, e.g., included in the indicating event) or wind speed variations. By performing such output power modulation, an improved contribution of wind turbine 1 to the stability of the electrical grid is possible. The rotational rotor speed $\omega$ varies accordingly. Furthermore, the transition from overproduction to recovery period does not need to be an abrupt reduction of the electrical output power (as shown in FIG. 5), but may be soft, e.g. according to a mathematical function (the transition could be significantly "smoother" than indicated in FIG. 5a).

The second embodiment (FIGS. 6 and 7) is mainly characterised by a different utilisation of $P_m$ during the recovery period. Again, the two-phased ancillary grid-stability supporting mode is initiated by controller 10 after it has detected an indicating event. The electrical output power $P_e$ is raised to 0.9 pu ($P_{e0}$ being 0.8 pu as also in the first embodiment) so that the wind turbine's 1 working point changes from point A to point B and—while the rotational rotor speed decreases—further on to point C. In the second embodiment, the minimum rotational rotor speed $\omega_{min}$ is slightly lower than in the first embodiment (for example, because the wind turbine according to the second embodiment has a full-scale converter instead of a DFIG, which allows for a larger deviation of generator speed and electrical grid frequency). Accordingly, the overproduction period is slightly longer (with same $\Delta P^{op}$ as in the first embodiment). When $\omega_{min}$ is reached, the controller again initiates the recovery phase. In the second embodiment, the minimum electrical output power $P_{emin}$ during the recovery period is set to 0.64 pu (which equates to 80% of $P_{e0}$=0.8 pu). The available mechanical rotor power $P_m$ at point D is only slightly above this lower threshold $P_{emin}$. Controller 10 now controls the wind turbine 1 in a way that for the first part of the recovery period only the minimum electrical output power is actually produced (i.e. $P_e$=$P_{emin}$ during this time frame). In this way, the power used for re-acceleration of rotor 2 increases with the increasing efficiency (or in other words: the "gap" between $P_m$ and $P_e$ increases over this first part of the recovery period as $P_m$ increases with higher $\omega$ and $P_e$ stays constant). Only in a second part of the recovery period—when $\omega$ has already nearly reached $\omega_0$—$P_e$ is (relatively fast) increased and, accordingly, $P_{acc}$ is decreased.

The effect of this procedure is a shorter recovery period because $\omega_0$—in comparison to the first embodiment—is reached significantly faster (FIG. 7). Hence, the recovery period is here only about twice as long as the overproduction period. However, this advantage is achieved only at the expense of a lower $P_e$ during the main part of the recovery period.

The third embodiment (FIG. 8) basically follows the diagram of FIG. 4, presented in connection with the first embodiment. However, in contrast to the first embodiment, the recovery period is now two-phased. In a first phase (from point D' to D in FIG. 8), the complete mechanical rotor power is converted into electrical output power (i.e. $P_m$=$P_e$). As a result, no power is left for rotor re-acceleration ($P_{acc}$=0 and rotor speed $\omega$ stays constant at $\omega_{min}$). The wind turbine's working point equals the point of intersection between arrow C-D and the $P_m$ curve in FIG. 4. In a second phase (from D to A' in FIG. 8), the electrical output power is slightly decreased (but still at or above the minimum $P_{emin}$) so that a portion of $P_m$ is released for rotor re-acceleration. The re-acceleration is then performed similar to the first embodiment.

The third embodiment permits a slightly higher contribution to the stability of the electrical grid 17 in the first phase of the recovery period. Of course, the recovery period is extended by the duration of the zero rotor re-acceleration so that, in the example of FIG. 8, it is about 6.5 times longer than the overproduction period.

The embodiments one to three have been described so far on the assumption that the wind turbine 1 operates in partial-load mode when an indicating event is detected by controller 1 and the ancillary control mode is initiated. Of course, the wind turbine 1 can also perform grid-stability supporting activity while operating in full-load mode (i.e. $P_{e0}$=$P_{nom}$, with available wind power $P_w$ corresponding to a higher power than the nominal electrical power of the wind turbine, cf. FIG. 9). In this case, the overproduction period, in general, does not differ from partial-load operation (apart from the fact that, as the wind turbine 1 will be operating at its nominal operating power prior to the overproduction period, the output power increase during the overproduction period will cause a temporary power output which temporarily exceeds the nominal power, but still lies within the wind turbine's tolerance range). The increased electrical output power is maintained until the minimum rotation rotor speed $\omega_{min}$ is reached. The overproduction period may be longer than in partial-load mode due to the increased kinetic energy stored in rotor 2 and additional support by blade pitching, depending on the respective $P_{emin}$ and the operating constraints of generator 9, i.e. the wind turbine's 1 dynamic operation range (cf. FIG. 3). In the embodiment according to FIG. 9, the blades are deflagged during the overproduction period, thus gaining additional lift force that can be converted into additional electrical power or used to reduce rotor deceleration. Similarly, the recovery period can be shortened by utilizing the excess wind power for rotor re-acceleration in a similar manner. In the example of FIG. 9, the overproduction period is therefore longer (in comparison with the previous embodiments referring to partial-load mode, cf. e.g. FIG. 5), and the recovery period is only twice as long as the overproduction period.

Figure 10:
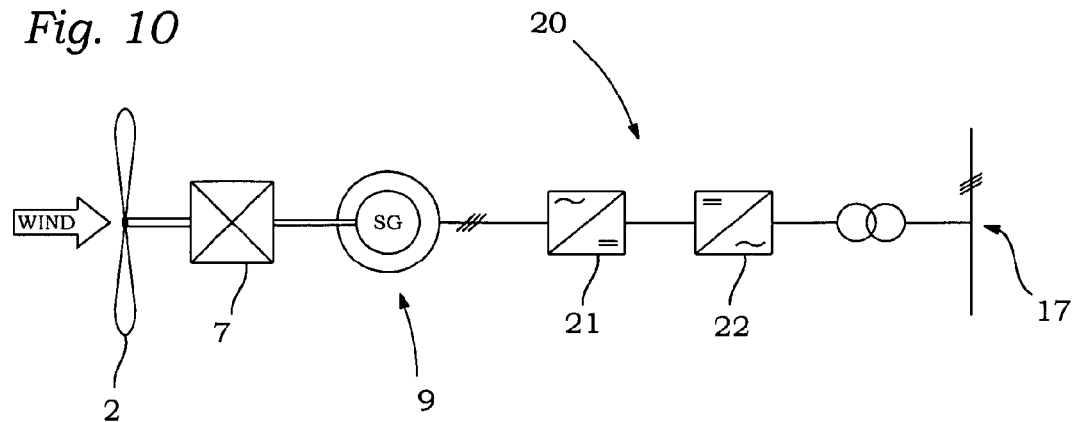
FIG. 10 schematically shows the mechanical and electrical components of a wind turbine with a synchronous generator and a full-scale converter.
Figure 11:
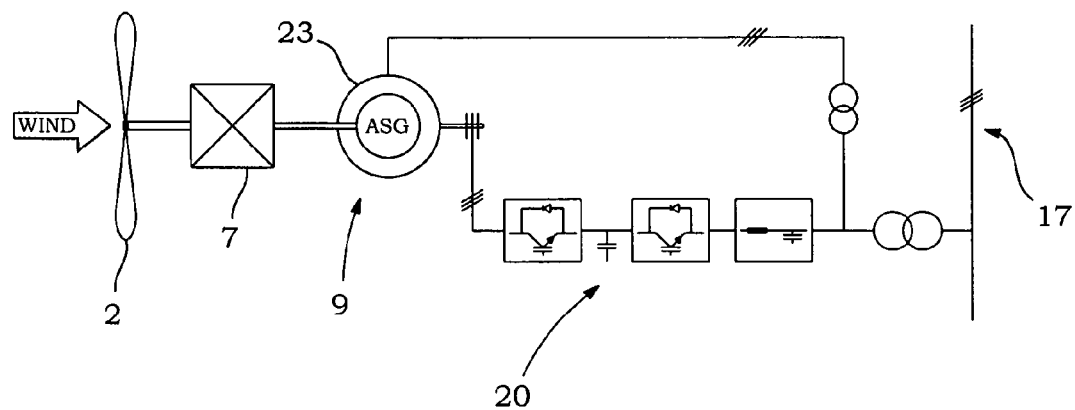
FIG. 11 schematically shows the mechanical and electrical components of a wind turbine with a Doubly-Fed Induction Generator (DFIG)

In all embodiments described, the wind turbine 1 may, for example, be equipped with a synchronous generator having a full-scale converter (FIG. 10) or, alternatively, with a Doubly-Fed Induction Generator (DFIG) (FIG. 11). In the first case, 100% of the generated electrical power $P_e$ passes through the converter 20 which has a rectifier 21 and an inverted rectifier 22. In the latter case, stator winding 23 is directly connected to the electrical grid 17 and the rotor-grid connection is realised by using a converter 20 which can, for example, be a cascading converter with DC link (cf. FIG. 11). Hence, only about 30% of the produced electrical output power $P_e$ passes through converter 20 while the main portion is fed directly into the electrical grid 17.

Figure 12:
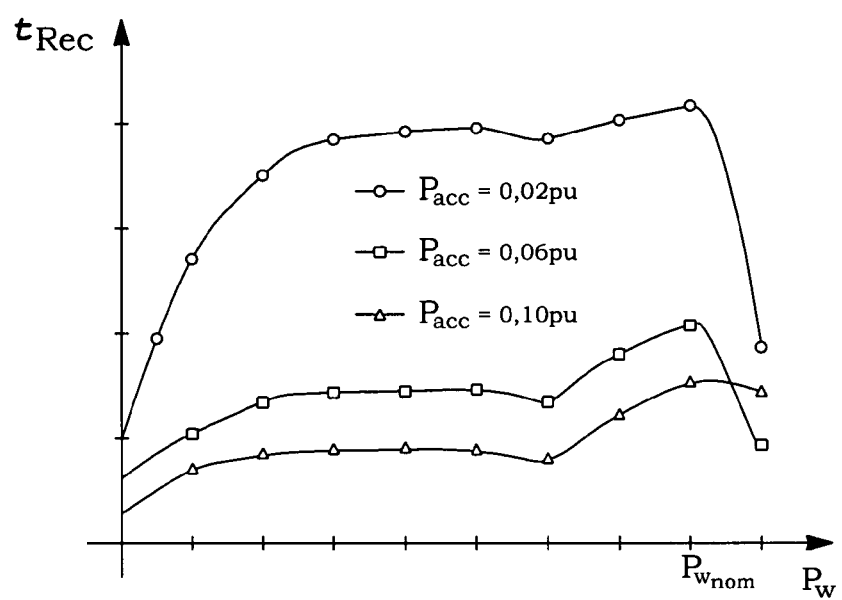
FIG. 12 exemplarily shows the duration of the recovery period for different levels of electrical output power in dependency on the wind speed.

The duration of the recovery period is not only dependent on the power used for rotor re-acceleration ($P_{acc}$), but also on the prevailing wind speed. FIG. 12 visualizes durations of the recovery period for control modes according to the first embodiment (fixed amount of re-acceleration power $P_{acc}$ during the recovery period) in dependence on the wind speed. In a first variant, $P_{acc}$ is chosen to be relatively small (0.02 pu) so that the recovery period is relatively long. If $P_{acc}$ is set to higher amounts (0.06 pu and 0.1 pu in FIG. 12), the duration of the recovery period generally decreases. Higher wind speed generally tends to result in a longer duration. In particular, if $P_{acc}$ is set to a relatively small value (0.02 pu in FIG. 12), the duration of the recovery period increases significantly with higher wind speeds. With wind speeds above the nominal value (full-load operation), the recovery period, however, decreases drastically (if, different from FIG. 9, the same amount of $P_m$ is used for rotor acceleration as in partial-load mode).

Figure 13:
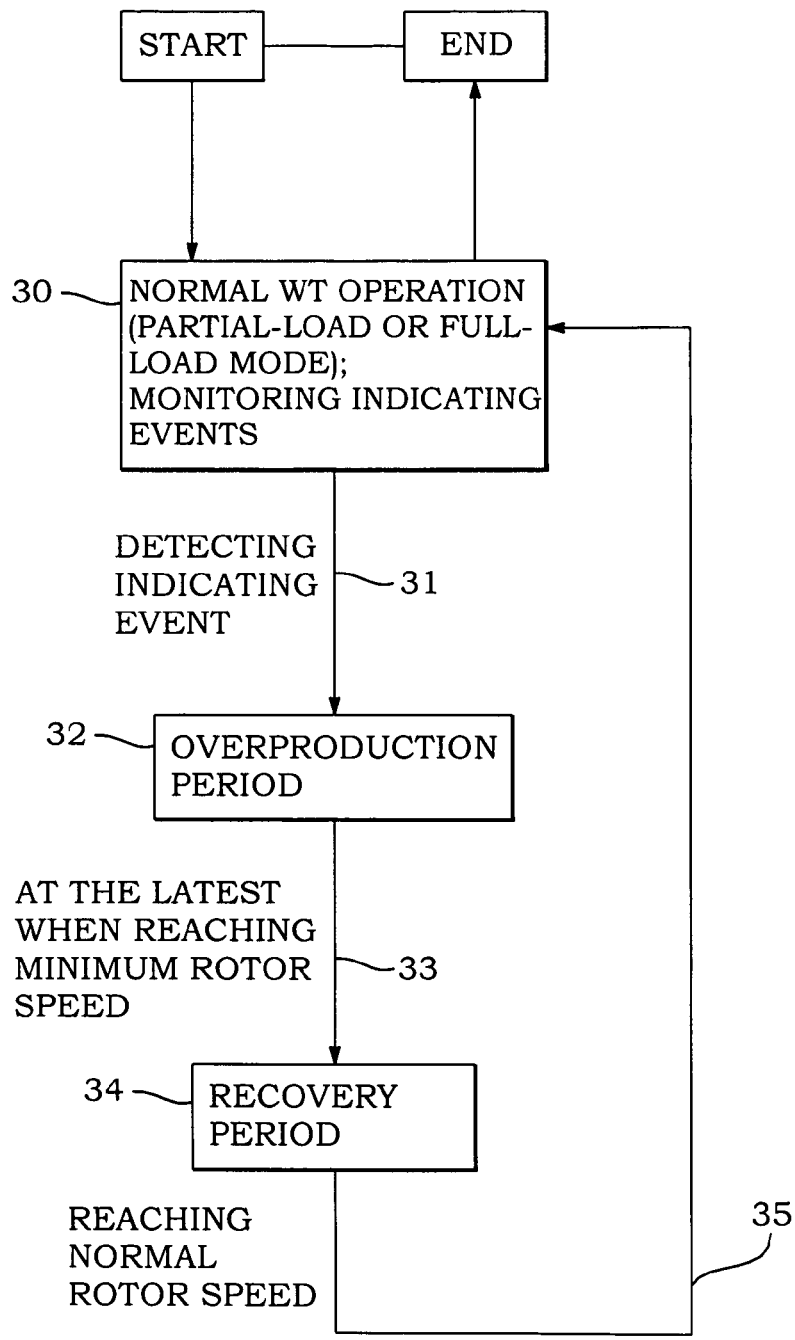
FIG. 13 illustrates the method of grid-stability support according to one aspect of the present invention.

According to one aspect of the present invention, a wind turbine control method for grid-stability support is provided (FIG. 13). Generally, the wind turbine 1 operates according to its standard policy 30 (e.g. maximum power tracking, cf. also the production curve in FIG. 3). Events which indicate a need for additional $P_e$ supply are monitored during 30. The monitoring may also include measurement of grid parameters (such as frequency variations or voltage angle change), the determination of the extent of grid support and (detailed) instructions to wind turbine 1. When such an indicating event is detected (arrow 31), the wind turbine 1 executes the overproduction period at 32. As described in detail above, kinetic energy is extracted from rotor 2 and converted into additional electrical power $\Delta P_{op}$ while rotor speed $\omega$ decreases more and more. The electrical output power may be varied or modulated. The recovery period may be initiated prior to reaching the minimum rotor speed $\omega_{min}$, for example, when the electrical grid appears to be stable again, an elapsed time or wind turbine internal operating conditions such as overheating of components or wind turbine load. However, it is entered, at the latest, when the minimum rotor speed $\omega_{min}$ is reached (arrow 33). In the recovery period, the rotor 2 is re-accelerated again and at least a certain amount of $P_e$ is still supplied to the electrical grid 17. Other activities dependent on the previous grid-stability support may also be performed during the recovery period in order to restore normal wind turbine operation, such as the cooling down of heated components, the dampening of mechanical osciallation etc. When the rotor 2 arrives at its normal rotational speed (e.g. $\omega_0$, assuming unchanged wind speed since entering the overproduction period at 32), the wind turbine 1 returns to its normal operation (arrow 35).

The wind turbine functionality and control method described and claimed herein is not exclusive. The wind turbine described herein may be arranged to perform further grid-stabilizing activities besides the described ones, such as decreasing power generation in a transient manner in the case of a sudden grid power oversupply (e.g. when a significant power consumer is disconnected from the grid) or counteracting periodic disturbances (e.g. grid frequency oscillations) etc.

The invention claimed is:

1. A variable speed wind turbine for connection to an electrical grid, configured to provide additional electrical power to counteract non-periodic disturbances in the electrical grid, comprising:
  a rotor with blades coupled to an electrical generator;
  a controller which monitors events indicating a need to increase electrical output power from the wind turbine to the electrical grid to support the stability of the electrical grid, the controller being configured to control the wind turbine to perform grid-stability supporting activity, in a non-periodic manner,
  wherein, after an indicating event has been detected, the wind turbine enters an overproduction period in which the electrical output power is increased beyond a first electrical operating power, wherein the additional electrical output power is taken from kinetic energy stored in the rotor and, if the wind turbine is operating in a partial load-mode, the additional electrical output power is taken without changing the operation of the wind turbine to a more efficient working point,
  wherein, before a rotational speed of the rotor reaches a minimum value the wind turbine enters a recovery period to re-accelerate the rotor to a previous rotational speed while further contributing to the stability of the electrical grid by outputting at least a predetermined minimum electrical power to the electrical grid.

2. The wind turbine according to claim 1, wherein the controller is configured to control the wind turbine such that the predetermined lower output power during the recovery period is a fixed percentage of the first electrical operating power.

3. The wind turbine according to claim 1, wherein the controller is configured to control the wind turbine such that, during the recovery period, at least 80% of the first electrical operating power which was supplied to the electrical grid prior to the overproduction period is output to the electrical grid.

4. The wind turbine according to claim 1, wherein the controller controls the power used to accelerate the rotor such that predetermined minimum rotor acceleration is ensured.

5. The wind turbine according to claim 1, further comprising equipment for measuring at least one of: rotational speed of the rotor, wind speed, a moment at a root of one of the blades and a torque at a rotor shaft and wherein the controller is configured to control, during the recovery period, the power used to accelerate the rotor by continuously measuring at least one of: the rotational speed of the rotor, the wind speed, the moment at the root of one of the blades and the torque at the rotor shaft and calculating an available mechanical rotor power from at least one of these parameters.

6. The wind turbine according to claim 1, wherein the controller is configured to initiate the recovery period when at least one of: the electrical grid is stabilized, a duration of the overproduction period reaches a time limit and an amount of additional energy provided to the electrical grid during the overproduction period reaches a predefined limit.

7. The wind turbine according to claim 1, wherein the controller is configured to control at least one of a rotational speed of the rotor and the electrical output power during the recovery period such that the previous rotational rotor speed is reached within a predetermined time period.

8. The wind turbine according claim 1, wherein the controller is configured to control at least one of a rotational speed of the rotor and the electrical operating power during the recovery period such that at least one of the rotational speed and electrical operating power is varied during the recovery period according to a predetermined function with a predetermined gradient.

9. The wind turbine according to claim 1, wherein the controller is configured to control the wind turbine such that a duration of the recovery period is at least twice as long as a duration of the overproduction period.

10. The wind turbine according to claim 1, further comprising a blade pitch-control system, wherein the controller is configured to adjust a blade pitch angle during at least one of the overproduction and recovery periods based on a rotor speed change so that efficiency decrease of the power conversion is reduced during at least one of the overproduction and recovery periods.

11. The wind turbine according to claim 10, wherein the wind works in a full-load mode with the blades in an at least partial flag position, wherein the controller controls the wind turbine such that, if available wind power corresponds to a higher electrical power than a nominal operating power of the wind turbine, the amount of flagging is reduced during at least one of the overproduction and recovery periods so that at least a portion of the available wind power is used to at least one of: reduce de-acceleration of the rotor, increase re-acceleration of the rotor, and increase electrical output power.

12. The wind turbine according to claim 1, wherein the controller is configured to monitor, detect and process indicating events based one at least one of a grid frequency and or the voltage angle change.

13. The wind turbine according to claim 1, wherein the electrical generator is a full-scale generator wherein the minimum value of the rotational speed at which the controller initiates the recovery period is a minimum speed at which the wind turbine is operable to produce a minimum power output required during the recovery period and required to re-accelerate the rotor.

14. The wind turbine according to claim 1, wherein the electrical generator is a doubly-fed induction generator wherein the minimum value of the rotational speed at which the controller initiates the recovery period is the highest value of one of the following: a minimum speed at which the doubly-fed induction generator is operable to produce a minimum power output required during the recovery period and required to re-accelerate the rotor, and a constructional lower threshold of the rotational speed range of the generator.

15. A controller controlling the operation of a variable speed wind turbine having a rotor with blades and being arranged for connection to an electrical grid, the controller is configured to perform grid-stability supporting activity, in a non-periodic manner, the controller:
monitors events indicating a need to increase electrical output power from the wind turbine to the electrical grid to support the stability of the electrical grid,
after an indicating event has been detected, initiates an overproduction period in which the electrical output power is increased beyond a first electrical operating power, wherein the additional electrical power is taken from kinetic energy stored in the rotor and, if the wind turbine is operating in a partial-load mode, the additional electrical power is taken without changing the operation of the wind turbine to a more efficient working point, and
before a rotational speed of the rotor reaches a minimum value initiates a recovery period to re-accelerate the rotor to a previous rotational speed while further contributing to the stability of the electrical grid by outputting at least a predetermined minimum electrical power to the electrical grid.

16. A method of controlling a variable speed wind turbine for providing additional electrical power to counteract non-periodic grid disturbances, the wind turbine having a rotor with blades and being arranged for connection to an electrical grid, the non-periodic method comprising:
monitoring events indicating a need to increase electrical output power from the wind turbine to the electrical grid to support the stability of the electrical grid;
after an indicating event has been detected, increasing the electrical output power during an overproduction period beyond a first electrical operating power, wherein the additional power is taken from kinetic energy stored in the rotor and, if the wind turbine is operating in a partial-load mode, the additional electrical power is taken without changing the operation of the wind turbine, to a more efficient working point; and
before a rotational speed of the rotor reaches a minimum value accelerating the rotational speed of the rotor to a previous rotational speed during a recovery period while further contributing to the stability of the electrical grid by outputting at least a predetermined minimum electrical power to the electrical grid.

* * * * *